US007715318B2

(12) United States Patent
Haghighat et al.

(10) Patent No.: US 7,715,318 B2
(45) Date of Patent: May 11, 2010

(54) COMMUNICATION APPARATUS AND METHOD USING FORWARD ERROR CORRECTING STATISTICS FOR ADAPTIVE MODULATION FEEDBACK

(75) Inventors: Afshin Haghighat, Pierrefonds (CA); Louis E. Pouliot, Montreal (CA)

(73) Assignee: Interdigital Technology Corporation, Wilmington, DE (US)

( * ) Notice: Subject to any disclaimer, the term of this patent is extended or adjusted under 35 U.S.C. 154(b) by 1136 days.

(21) Appl. No.: 11/211,239

(22) Filed: Aug. 25, 2005

(65) Prior Publication Data

US 2007/0049207 A1    Mar. 1, 2007

(51) Int. Cl.
*H04L 1/00* (2006.01)
*H04L 1/20* (2006.01)
*H04B 7/14* (2006.01)

(52) U.S. Cl. .......................... 370/235; 370/232; 455/69
(58) Field of Classification Search .................... 455/69
See application file for complete search history.

(56) References Cited

U.S. PATENT DOCUMENTS

| 5,940,439 | A * | 8/1999 | Kleider et al. ............... 375/225 |
| 6,597,923 | B1 * | 7/2003 | Vanghi et al. ............... 455/522 |
| 6,625,179 | B1 * | 9/2003 | Doetsch et al. ............. 370/529 |
| 6,980,602 | B1 * | 12/2005 | Kleinerman et al. ........ 375/262 |
| 2002/0054578 | A1 * | 5/2002 | Zhang et al. ................. 370/328 |
| 2003/0128658 | A1 * | 7/2003 | Walton et al. ................ 370/208 |
| 2004/0057468 | A1 * | 3/2004 | Shieh et al. .................. 370/514 |
| 2006/0136798 | A1 * | 6/2006 | Domagala et al. ............ 714/752 |

* cited by examiner

*Primary Examiner*—Rafael Pérez-Gutiérrez
*Assistant Examiner*—Frank Donado
(74) *Attorney, Agent, or Firm*—Volpe and Koenig, P.C.

(57) ABSTRACT

Methods and apparatus for wireless communications systems provide adaptive modulation feedback to enhance wireless communications for wireless stations that use forward error correcting (FEC) by basing the adaptive modulation feedback on FEC statistics.

12 Claims, 3 Drawing Sheets

COMMUNICATION APPARATUS AND METHOD USING FORWARD ERROR CORRECTING STATISTICS FOR ADAPTIVE MODULATION FEEDBACK

FIELD OF THE INVENTION

The present invention relates to methods and apparatus for wireless communications systems, and in particular to systems that provide adaptive modulation feedback to enhance wireless communication.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs is connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In code division multiple access (CDMA) communication systems, multiple communications are sent in a shared spectrum. These communications are distinguished by their channelization codes. To more efficiently use the shared spectrum, hybrid time division multiple access (TDMA)/CDMA communication systems time divide the shared bandwidth into repeating frames having a specified number of timeslots. A communication is sent in such a system using one or multiple timeslots and one or multiple codes. For example, a UMTS time division duplex (TDD) communication system using CDMA uses fifteen (15) timeslots. In TDD, a particular cell's timeslot is used only for either uplink or downlink communications. Such conventional communications systems can be configured to utilize Forward Error Correction (FEC) in connection with wireless communications.

Adaptive modulation and coding (AM&C) are used to deal with the variety of bandwidths required for various communications. In AM&C, the modulation and coding scheme for transmitting data is varied to more efficiently use radio resources. To illustrate, the modulation used for data may be varied, such as using binary phase shift keying (BPSK), quadrature phase shift keying (QPSK), or M-ary quadrature amplitude modulation. Furthermore, the data may be assigned a single code in a timeslot, multiple codes in a timeslot, a single code in multiple timeslots or multiple codes in multiple timeslots.

Adaptive modulation enables a communication system to exploit the allocated channel bandwidth. Proper use of adaptive modulation requires some information on the state of the channel. Based on the health of the channel, a system can increase or decrease the modulation order to adapt the data rate to the usable part of the channel. Usually, an estimate of the received signal-to-interference/noise-ratio, received-signal-strength or even noise level of the signal that all could be an indicative of the bit-error-rate, are used as an indication of the health of the channel.

A conventional receiver configuration is illustrated in FIG. 2. A Front-end Receiver receives the modulated signals and strips a received signal's carrier frequency to provide a modulated communication signal for receiver processing. The modulated signal is processed by a demodulator of the receiver which typically includes a receive processor configured to output a demodulated version of the signal and a signal quality estimator configured to measure and collect information about the signal and output quality estimates such as a signal to noise ratio (SNR), signal to Interference Ratio (SNIR) or other metrics that are generated over selected time periods. Conventionally, such metrics which are generated over time in conjunction with demodulation are used to determine a signal quality indicator. The signal quality indicator can be generated by a transmit processor for inclusion in a signal as adaptive modulation feedback which is then modulated and sent back to the wireless station that had originally transmitted the received modulated signal. The station originating the modulated transmission can then use the adaptive modulation feedback to adjust the modulation of the signals it is transmitting by, inter alia, deciding how the order of modulation and/or the data-rate is to be adapted.

The inventors' have recognized that using an estimate of the signal-to-noise ratio or similar quality measures will not necessarily produce quality indicators in a manner to most effectively apply an adaptive feedback scheme. The conventional signal quality metrics produced in connection with demodulation may not be accurate and may not be easily mapped to a certain bit-error-rate or a quality-of-service requirement. This is especially more pronounced when a powerful channel-coding scheme is used. Also, since those types of measurements require accumulation of several demodulated symbols, the estimation becomes available with some delay. In some cases, the delay is not acceptable since the error-rate had already been significantly peaked and the performance of the link been deteriorated. Accordingly, the inventors' have recognize a need for an alternative scheme for providing adaptive modulation feedback.

SUMMARY

The invention provides methods and apparatus for wireless communications systems that provide adaptive modulation feedback to enhance wireless communications for wireless stations that use forward error correcting (FEC) by basing the adaptive modulation feedback on FEC statistics.

A wireless transmit receive unit (WTRU) is configured to provide adaptive modulation feed back for received communication signals. The WTRU has a receiver that includes a demodulator and a forward error correction (FEC) decoder. Preferably, the demodulator is configured to process received modulated communication signals for a particular communication channel and to produce demodulated signals. The FEC decoder is preferably configured to decode demodulated signals and output decoded information bits and FEC statistic information. An associated processor is configured to generate a quality indicator based on the FEC statistic information for transmission as adaptive modulation feedback with respect to received modulated signals. Accordingly, a WTRU from which modulated communications signals are received is enabled to adjust transmission modulation based upon reception of the adaptive modulation feedback generated by the FEC statistics processor.

Preferably, the FEC decoder is configured to output FEC statistic information from among the group of statistics including a number of corrected symbols, a number of uncorrectable symbols, a number of iterations and Viterbi trace weights and the processor is configured to generate an estimate of the bit error rate (BER) as the quality indicator. The demodulator, the FEC decoder and the processor can be implemented on an application specific integrated circuit (ASIC).

The WTRU can be configured for use in a Universal Mobile Telecommunications System (UMTS) as a user equipment (UE) or a base station. Such a WTRU preferably includes a receiver configured to receive modulated signals and a transmitter configured to transmit modulated signals including signals adaptive modulation feedback generated by the FEC statistics processor.

A method for implementing adaptive modulation feedback for received communication signals is also provided. Received modulated communication signals for a particular communication channel are processed to produce demodulated signals. Demodulated signals are FEC decoded to produce decoded information bits and FEC statistic information. A quality indicator is generated based on the FEC statistic information for transmission as adaptive modulation feedback with respect to received modulated signals. Accordingly, a WTRU from which modulated communications signals are received is enabled to adjust transmission modulation based upon reception of the adaptive modulation feedback.

Preferably, the decoding produces FEC statistic information from among the group of statistics including a number of corrected symbols, a number of un-correctable symbols, a number of iterations and Viterbi trace weights. An estimate of the bit error rate (BER) is preferably generated as the quality indicator.

The method is preferably performed by a WTRU configured for use in a Universal Mobile Telecommunications System (UMTS) as a user equipment (UE) or a base station that has a receiver configured to receive modulated signals and a transmitter configured to transmit modulated signals including the generated adaptive modulation feedback. The WTRU can have a demodulator, a FEC decoder and a processor implemented on an application specific integrated circuit (ASIC) so that the processing received modulated communication signals, decoding demodulated signals and generating a quality indicator are performed by the ASIC.

Other objects and advantages will be apparent to those of ordinary skill in the art based upon the following description of presently preferred embodiments of the invention.

DETAILED DESCRIPTION OF THE PREFERRED EMBODIMENT(S)

Figure 1:
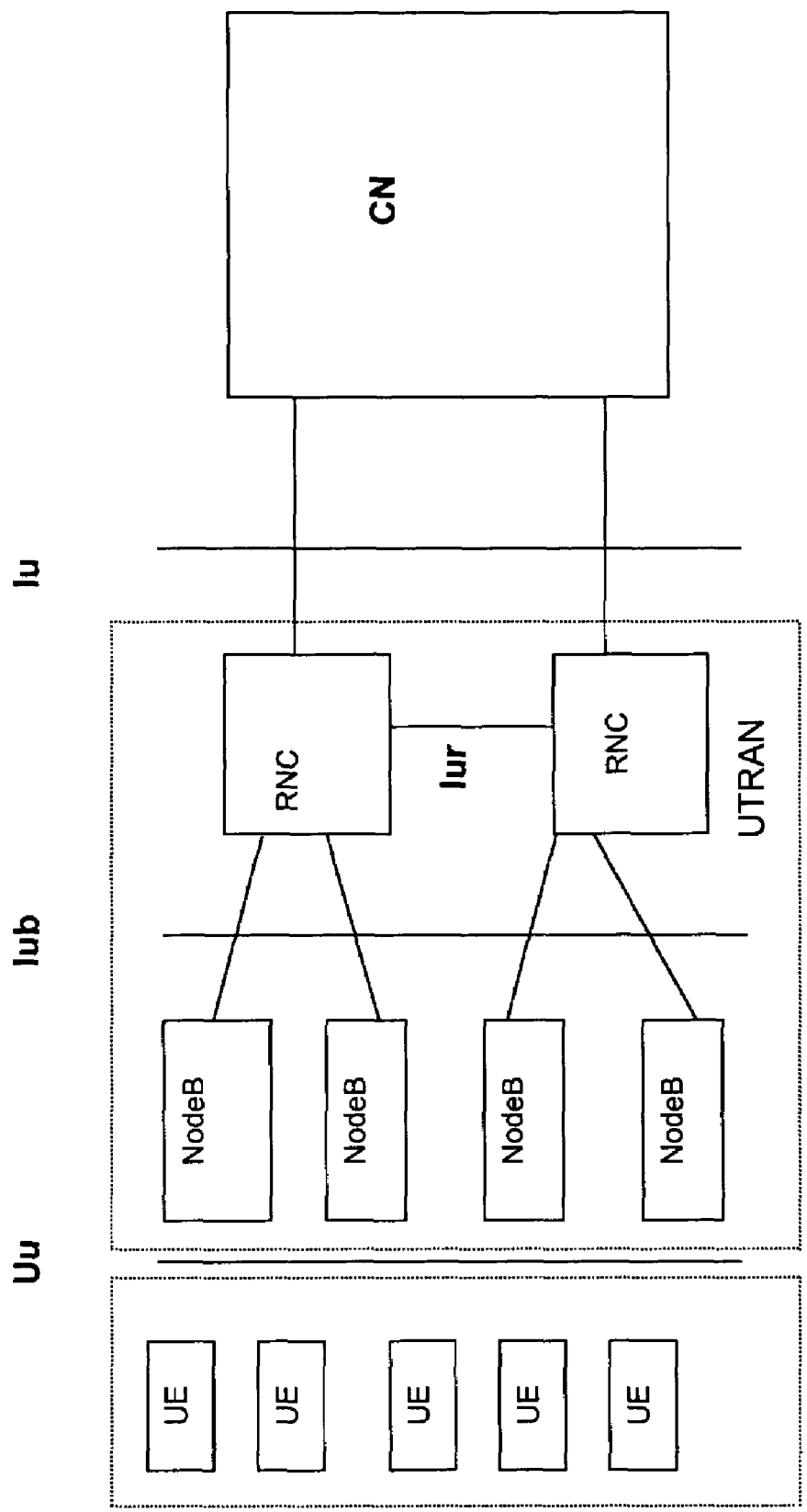
FIG. 1 shows an overview of system architecture of a conventional UMTS network.
Figure 2:
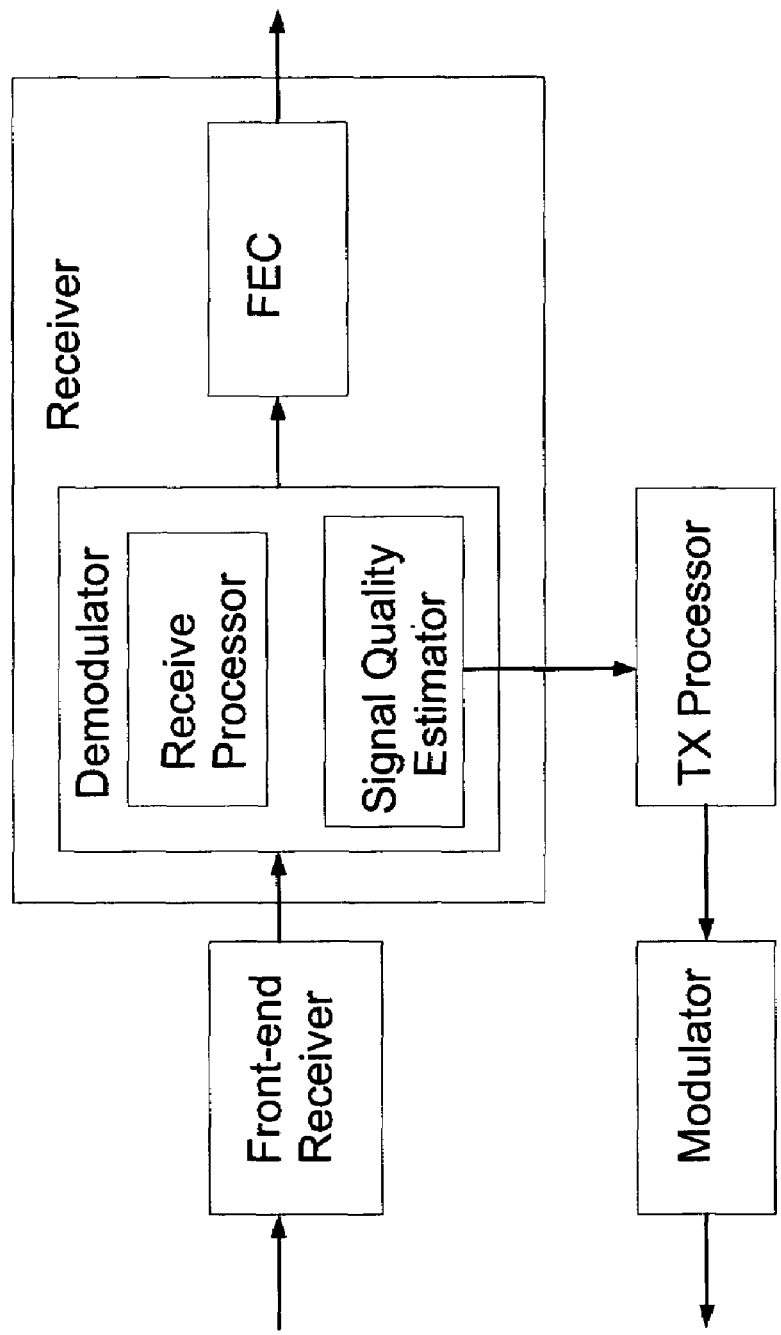
FIG. 2 is a block diagram of a conventional WTRU which produces adaptive modulation feedback.

The present invention is described with reference to the drawing figures wherein like numerals represent like elements throughout. The terms base station, wireless transmit/ receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention is particularly useful when used in conjunction with mobile units, i.e., mobile WTRUs, as well as base station WTRUs that receive wireless communications from mobile units that are configured to utilize Forward Error Correction (FEC). For example, the invention can be implemented in either UEs or Node Bs of the conventional UTMS system illustrated in FIG. 1.

Figure 3:
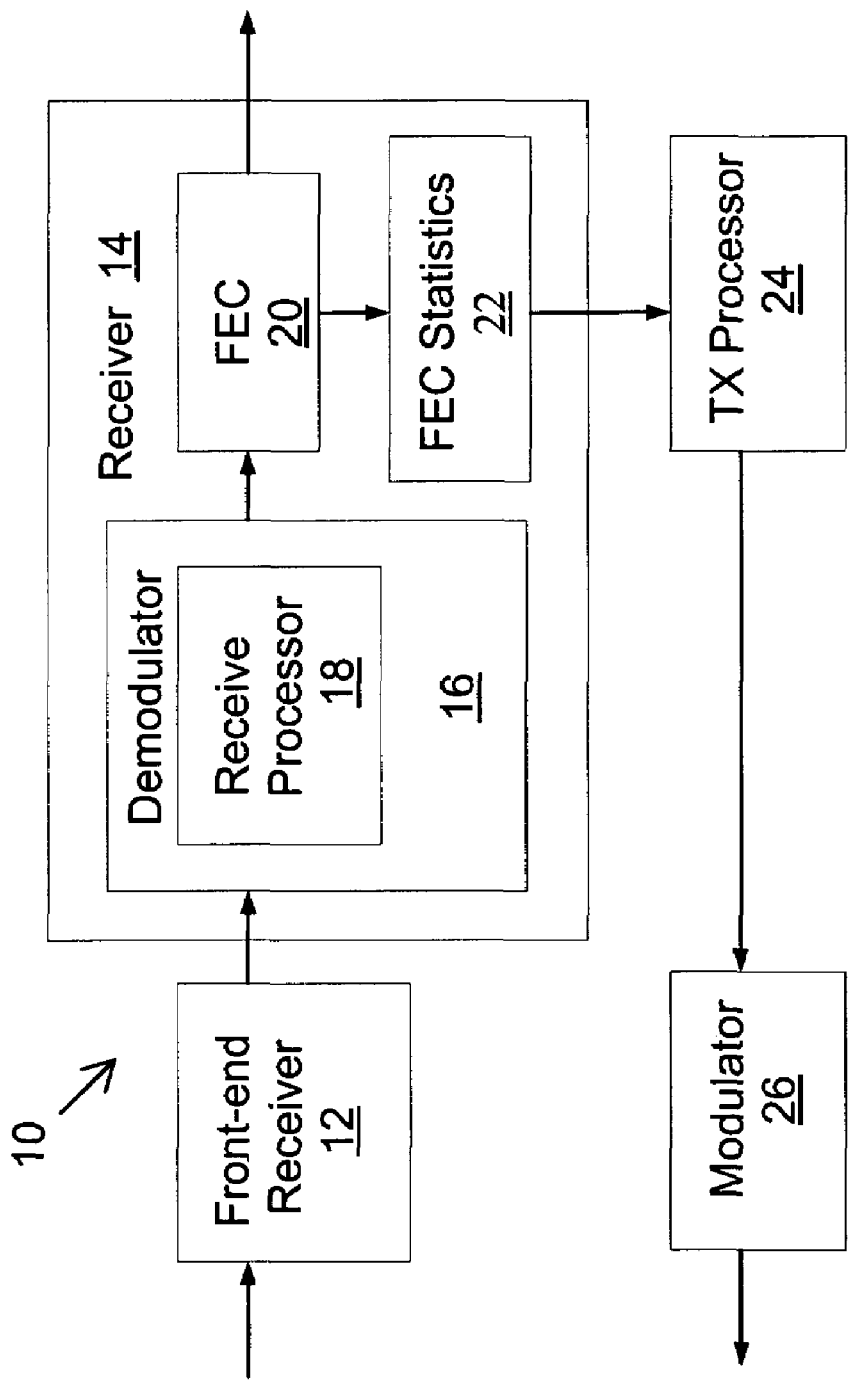
FIG. 3 is a block diagram of a WTRU which produces adaptive modulation feedback made in accordance with the teaching of the present invention.

Referring to FIG. 3, a WTRU 10 in accordance with the invention that is configured to utilize FEC is illustrated. The WTRU 10 includes a front-end receiver 12 which receives communication signals and strips a received signal's carrier frequency to provide a modulated communication signal for processing by a receiver component 14. The modulated signal is processed by a demodulator 16 of the receiver 14 which includes a receive processor 18 configured to output a demodulated version of the modulated signal. Although not shown in FIG. 3, the demodulator 16 may also include a signal quality estimator configured to measure and collect information about the signal and output quality estimates such as a signal to noise ratio (SNR), signal to Interference Ratio (SNIR) or other metrics that are generated over selected time periods.

The output of the demodulator 16 is configured to produce a demodulated signal suitable for FEC decoding by a FEC decoder 20 that in turn outputs decoded information bits.

The inventors have recognized that the information available through the conventional FEC decoding process can be used as an indicative of the channel state for adapting the modulation. Information such as, the number of corrected symbols, the number of un-correctable symbols, number of iterations, Viterbi trace weights or basically any other information from the FEC that carry some statistics on the operation of FEC, can be used for this purpose. Accordingly, the FEC decoder 20 is configured with an additional output coupled to a FEC Statistic Processor 22. The FEC Statistic Processor 22 uses statistics from the FEC decoding to produce a quality indicator for use as adaptive modulation feedback. Using the FEC operation statistics for adaptive adjustment of modulation has the advantage of providing sufficient time for adaptation before the performance degrades and affects the quality-of-service.

For example, the FEC statistics can be used as a channel quality indicator as follows. In an iterative-based FEC, such as where turbo-codes are used, the decoder decodes the received message in several attempts in an iterative fashion. In each iteration, some corrections are made and the resulting partially corrected message is used towards the next iterations. As such, depending on the quality of the channel for a given target BER, a different number of iterations is required. Thus, by monitoring the number of iterations required to achieve a certain target BER, an estimate on the quality of the channel can be derived.

The quality indicator generated by the FEC Statistic Processor 22 are preferably passed to a transmit processor 24 of the WTRU 10. The transmit processor 24 preferably provides a formatted signal which includes the adaptive modulation feedback to a modulator 26 of the WTRU 10 for transmission to the wireless station from which the WTRU 10 received the communication signals. The wireless station originating the modulated transmission can then use the adaptive modulation feedback to adjust the modulation of the signals it is transmitting by, inter alia, deciding how the order of modulation and/or the data-rate is to be adapted.

For example, the modulation scheme can be updated based on the FEC statistic based indicators as follows:

If the indicator shows a "very good" quality of channel, e.g., if the BER calculated based on the FEC statistics is less than a low BER threshold, the scheme of modulation is adapted to improve efficiency (in terms of transmission capacity);

And if the indicator shows a "bad" quality of channel, e.g., if the BER calculated based on the FEC statistics is greater than a high BER threshold, the scheme of modulation is adapted to improve robustness (in terms of transmission capacity);

If the indicator shows a "good" quality of channel, e.g., if the BER calculated based on the FEC statistics is between the high and low BER thresholds, the scheme of modulation is kept the same.

High and low thresholds are defined based on the application as well as the expected level of the Quality of Service (QoS). However, the thresholds can be set to be dynamically adjusted or various levels of indicators can be defined in order to need the system requirements.

Preferably, the components of the FEC receiver 14 are implemented on a single integrated circuit, such as an application specific integrated circuit (ASIC). However, the components may also be readily implemented on multiple separate integrated circuits or in software on general purpose CPUs/DSPs.

Although the features and elements of the present invention are described in the preferred embodiments in particular combinations, each feature or element can be used alone (without the other features and elements of the preferred embodiments) or in various combinations with or without other features and elements of the present invention.

Other variations and modifications consistent with the invention will be recognized by those of ordinary skill in the art.

What is claimed is:

1. A wireless transmit receive unit (WTRU) configured to provide adaptive modulation feed back for received communication signals comprising:

a demodulator configured to process received modulated communication signals for a particular communication channel and to produce demodulated signals;

an iterative-based forward error correction (FEC) decoder configured to decode demodulated signals by performing a variable number of decoding iterations until a target bit error rate (BER) is achieved and output decoded information bits and FEC statistic information including the number of decoding iterations; and a processor configured to generate a quality indicator based on the FEC statistic information including the number of decoding iterations for transmission as adaptive modulation feedback with respect to received modulated signals whereby a WTRU from which modulated communications signals are received is enabled to adjust transmission modulation based upon reception of the adaptive modulation feedback generated by said processor.

2. The WTRU of claim 1 wherein the FEC decoder is configured to output additional FEC statistic information from among the group of statistics including a number of corrected symbols, a number of un-correctable symbols, and Viterbi trace weights.

3. The WTRU of claim 2 wherein the processor is configured to generate an estimate of bit error rate (BER) as the quality indicator.

4. The WTRU of claim 3 configured for use in a Universal Mobile Telecommunications System (UMTS) as a user equipment (UE) or a base station including a receiver configured to receive modulated signals and a transmitter configured to transmit modulated signals including signals adaptive modulation feedback generated by said processor.

5. The WTRU of claim 4 wherein the demodulator, the FEC decoder and the processor are implemented on an application specific integrated circuit (ASIC).

6. The WTRU of claim 1 configured for use in a Universal Mobile Telecommunications System (UMTS) as a user equipment (UE) or a base station including a receiver configured to receive modulated signals and a transmitter configured to transmit modulated signals including signals adaptive modulation feedback generated by said processor.

7. The WTRU of claim 1 wherein the demodulator, the FEC decoder and the processor are implemented on an application specific integrated circuit (ASIC).

8. A method for implementing adaptive modulation feedback for received communication signals comprising:

processing received modulated communication signals for a particular communication channel and to produce demodulated signals;

decoding demodulated signals using an iterative-based forward error correction (FEC) process by performing a variable number of decoding iterations until a target bit error rate (BER) is achieved to produce decoded information bits and FEC statistic information including the number of decoder iterations; and generating a quality indicator based on the FEC statistic information including the number of decoder iterations for transmission as adaptive modulation feedback with respect to received modulated signals whereby a WTRU from which modulated communications signals are received is enabled to adjust transmission modulation based upon reception of the adaptive modulation feedback.

9. The method of claim 8 wherein the decoding produces additional FEC statistic information from among the group of statistics including a number of corrected symbols, a number of un-correctable symbols and Viterbi trace weights.

10. The method of claim 9 wherein an estimate of bit error rate (BER) is generated as the quality indicator.

11. The method of claim 10 performed by a WTRU configured for use in a Universal Mobile Telecommunications System (UMTS) as a user equipment (UE) or a base station that has a receiver configured to receive modulated signals and a transmitter configured to transmit modulated signals including the generated adaptive modulation feedback.

12. The method of claim 11 wherein the WTRU has a demodulator, a FEC decoder and a processor implemented on an application specific integrated circuit (ASIC) and the processing received modulated communication signals, decoding demodulated signals and generating a quality indicator are performed by the ASIC.

* * * * *